(12) United States Patent
Moravec (10) Patent No.: US 7,446,766 B2
(45) Date of Patent: Nov. 4, 2008

(54) MULTIDIMENSIONAL EVIDENCE GRIDS AND SYSTEM AND METHODS FOR APPLYING SAME

(75) Inventor: Hans Moravec, Pittsburgh, PA (US)

(73) Assignee: Seegrid Corporation, Lowell, MA (US)

( * ) Notice: Subject to any disclaimer, the term of this patent is extended or adjusted under 35 U.S.C. 154(b) by 58 days.

(21) Appl. No.: 11/350,195

(22) Filed: Feb. 8, 2006

(65) Prior Publication Data

US 2006/0178828 A1    Aug. 10, 2006

Related U.S. Application Data

(60) Provisional application No. 60/650,904, filed on Feb. 8, 2005.

(51) Int. Cl.
*G06T 17/00* (2006.01)
(52) U.S. Cl. .............. 345/424; 345/419; 345/427; 345/629; 352/57; 701/211
(58) Field of Classification Search .......... 345/419, 345/424, 427, 629; 701/211; 352/57
See application file for complete search history.

(56) References Cited

U.S. PATENT DOCUMENTS 5,684,695 A    11/1997    Bauer

2004/0013295 A1    1/2004    Sabe et al.

OTHER PUBLICATIONS

Moravec "Robots, After All", ACM, published Oct. 2003; pp. 90-97.*
Heuer, Von Steffan, "Herr und Knecht", Technology Review, Dec. 2003.
Murray, Don, and Little, James J., "Using Real-Time Stereo Vision for Mobile Robot Navigation", Autonomous Robots, vol. 8, Apr. 2000, (pp. 161-171).
Moravec, Hans P., Robot Spatial Perception by Stereoscopic Vision and 3D Evidence Grids, CMU-RI-TR-96-34, Sep. 1996 (pp. 1-42).
Martin, Martin C. and Moravec, Hans P., "Robot Evidence Grids", CMU-RI-TR-96-06, Mar. 1996, (pp. 1-48).

* cited by examiner

*Primary Examiner*—Kimbinh T Nguyen
(74) *Attorney, Agent, or Firm*—Mills & Onello LLP (57) ABSTRACT

A method of generating an evidence grid representing an environment comprises the steps of collecting a set of stereo images at multiple locations within the environment using stereo sensors, and processing the set of stereo images to determine occupancy and distance data associated with each point in space represented in the set of stereo images; applying a sensor model to each point in space to determine a probability of occupancy of each voxel representing each point in space; and generating an evidence grid of the environment by combining the probabilities for each voxel.

23 Claims, 8 Drawing Sheets

MULTIDIMENSIONAL EVIDENCE GRIDS AND SYSTEM AND METHODS FOR APPLYING SAME

RELATED APPLICATIONS

This application claims the benefit of provisional application Ser. No. 60/650,904 filed on Feb. 8, 2005 which is incorporated herein by reference in its entirety.

FIELD OF INTEREST

The present inventive concepts relate to systems and methods for generating and utilizing multidimensional representations of an environment.

BACKGROUND OF THE INVENTION

As an example, systems and methods for generating 2-dimensional (2-D) or 3-dimensional (3-D) representations of an environment can be useful in a variety of applications, such as in automated navigation systems and methods. For example, such automated systems and methods could be used to help guide a vehicle through the environment. As used herein, a vehicle can be any platform capable of translation through the environment, which may or may not be configured for carrying human passengers.

Previous attempts at providing automated navigation have been limited in their flexibility, and also in their success. Most current commercial systems employ a "guide-path following" technique. In this type of system, a guide-path is fixed to the floor, for example, and is followed by the vehicle. The guide-path may be made from wire, paint, or tape, or some combination thereof. In any case, the guide-path must be purposefully installed and maintained, and if changes are to be made to the vehicles translation through the environment, then the guide-path must be manually (i.e., physically) modified. Breaks in the guide-path can lead to system malfunction or stoppage.

Other systems use laser techniques that employ fixed targets in the facility and provide position data to the vehicle for use in geometric calculations used in navigation. Such systems require known positioning of the targets and mapping of the facility with respect to the targets. The use of lasers requires careful selection of the target locations, and the need to maintain "line of sight" relationships to the vehicles. Therefore, the usefulness of such a system is highly dependent an the stability and maintenance of the targets and the required line of sight relationships. Blocking a line of sight path between a target and the vehicle's laser or a corresponding receiver can cause system malfunction or stoppage.

Free ranging systems use odometry or inertial measurement units, or both and provide navigation based on a priori knowledge of the facility layout. To navigate, the system must know where within the facility it is, as a reference, and then tracks its way through according to the facility layout and its translation measurements with respect thereto. Such systems typically determine their location by measuring translation relative to at least one known position or reference point and navigates according to those measurements. These systems are extremely susceptible to error build-up over time, which limits their accuracy. Like the other systems, these types of systems are unable to respond to changes in the workplace.

"Evidence grids" have been suggested in some literature as a way to more effectively represent an area or volume. An evidence grid may take the form of a 2-D or 3-D pre-defined pattern of "voxels" representing the area or volume. Each "voxel" represents a point in space and may contain occupancy information about the point. Due to the sparsity of the data in 2-D evidence grids, they tend to be unreliable and impractical in real-world environments. Three-dimensional evidence grids, as known in the prior art, are more promising due to the much richer data set they tend to include. However, construction of such 3-D evidence grids has been computationally burdensome—to the point of having limited real-world application.

To alleviate such problems, most systems and methods rely primarily on "feature extraction" to reduce the typically computational burdens—by making relatively informed guesses from the voxel data collected within the environment based on patterns of voxel information presumed to represent one or more features of known objects. This can lead to unsatisfactory and potentially intolerable results when guesses are wrong or when the computational burden makes the system too slow for practical applications.

SUMMARY OF THE INVENTION

A method of generating an evidence grid representing an environment comprises the steps of collecting a set of stereo images at multiple locations within the environment using stereo sensors, and processing the set of stereo images to determine a figure of merit, occupancy probability and distance associated with each point in space represented in the set of stereo images; applying a sensor model to each point in space to determine a probability of occupancy of each voxel representing each point in space; and generating an evidence grid of the environment by combining the probabilities for each voxel.

The method may further include navigating through the environment by taking glimpses of image data and comparing corresponding voxel data taken from the glimpses with voxel data in the evidence grid—which tells the system its current location.

A computer system and set of databases may be configured to implement the above steps.

In accordance with one aspect of the invention, a method of generating a multidimensional evidence grid representing an environment may comprise collecting stereo data at multiple locations within the environment using stereo sensors. The method may also include generating, from the stereo data, probability clouds comprising voxels, each voxel representing an occupancy of a corresponding point in space; from the probability clouds, generating maps comprising combined probabilities of voxels associated with the points in space; and combining the maps to form a multidimensional evidence grid representing the environment with a plurality of voxels, each voxel embodying a resulting probability of occupancy corresponding point in space.

In accordance with another aspect of the invention, a mobile apparatus configured for automated navigation within an environment may comprise a mobile body configured for motorized translation within an environment; a translator configured to translate the mobile body in response to a set of navigation instructions; a set of stereo sensors configured for acquiring stereo data within the environment; a storage device including a multidimensional evidence grid comprising a plurality of voxels representing the environment and having associated with each voxel a probability of occupancy. A processor may be included and configured for executing a set of navigation logic configured for taking glimpses of the environment using the stereo sensors, wherein a glimpse comprises glimpse stereo data taken during navigation; associating probability and location data from the glimpse stereo data with voxels in the evidence grid; and determining the location of the mobile apparatus by comparing the glimpse stereo data associated with the voxels with the probabilities associated with corresponding voxels in the evidence grid.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

In accordance with the present invention, provided are a system and method for building improved multi-dimensional evidence grids representing a space or volume, also referred to as an "environment", which could be a facility. Stereo ranging is used to collect information and data related to occupation of the environment by objects (e.g., walls, furniture, fixtures, or other tangible objects), as discussed in Related Information at the close of this description, which provides further detail on evidence grids. Stereo ranging involves the collection of data using at least one set of sensors. A set of sensors includes at least two data collection sensors, sometimes referred to herein as "stereo sensors" or "stereo ranging sensors." Sensor models (SMs) characterize noise or other inaccuracies introduced by the stereo sensors, and are applied to improve the quality of the collected stereo data and information by removing or compensating for such noise or inaccuracies. Probabilities of occupancy of points in space by, for example, an object, part of an object or feature thereof, may be determined from the stereo data. The points in space may be represented by "voxels" and the probability of occupancy may be represented by a "voxel volume." Taking stereo data of points in space from multiple locations within the environment yields a set of probability data, e.g., a plurality of probability values, for each point in space. Maps may be constructed as combinations or derivations of the probability data of the points in space and a multidimensional evidence grid comprising voxels having resulting occupancy information for points in space within the environment may then be formed from the maps. The evidence grid may be constructed, at least initially, by translating the system (or at least a set of stereo sensors) through the environment one or more times, sometimes referred to as "training."

Once the evidence grid is built, highly accurate navigation through the environment is possible, using subsequent evidence grid "glimpses" that are taken during the navigation—i.e., in real or near-real time. Each glimpse is a collection of stereo data taken from stereo sensors; the stereo data may serve at least two functions. First, for navigation purposes, a glimpse may be used to determine where within the evidence grid the system is or was when the glimpse was taken. Here, the evidence grid serves as a frame of reference for analyzing or processing the glimpse. A comparison of the probability information generated from the glimpse stereo data with the probability data of the evidence grid can yield, with confidence, a determination of location within the evidence grid, and thus within the environment.

Unlike prior art systems, the present invention allows for navigation through the environment without any modifications to the existing facility, e.g., fiducial marks, glide-paths and so on, nor does it require making static detailed offline maps of the facility that do not allow for automated and dynamic compensation to changes in the environment. A second utility of the glimpses is to provide real (or near real) time updates of the evidence grid. That is, the probability data from the glimpse stereo data can be incorporated into the evidence grid, which gives the system a dynamic updating capability. This allows the evidence grid to be automatically and dynamically updated to reflect changes in the environment, such as a moved piece of furniture or equipment. Therefore, for various reasons, a system and method in accordance with the present invention has a robustness not found in other navigation systems.

Figure 1A:
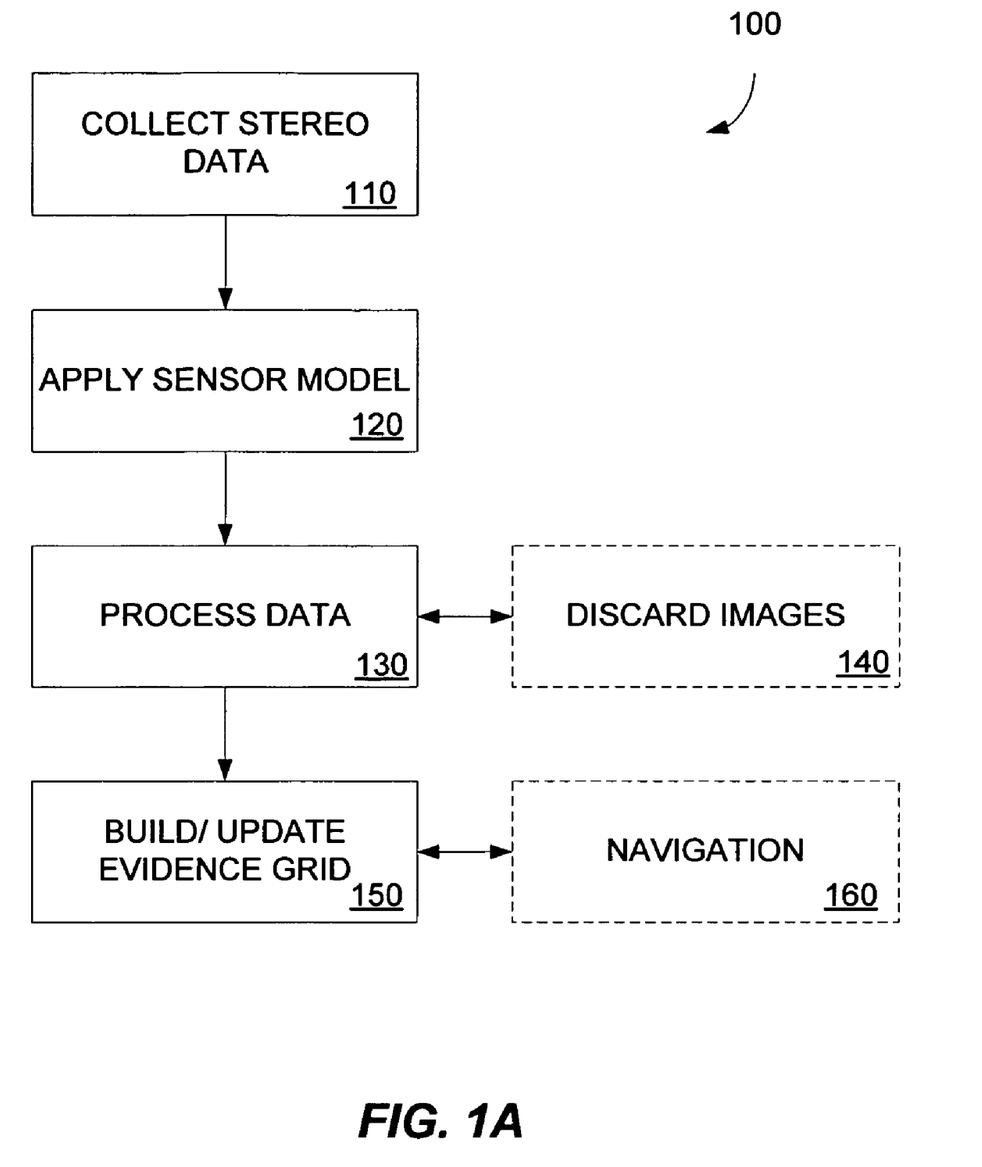
FIG. 1A and FIG. 1B are flowcharts depicting illustrative embodiments of methods of building an evidence grid in accordance with the present invention.
Figure 1B:
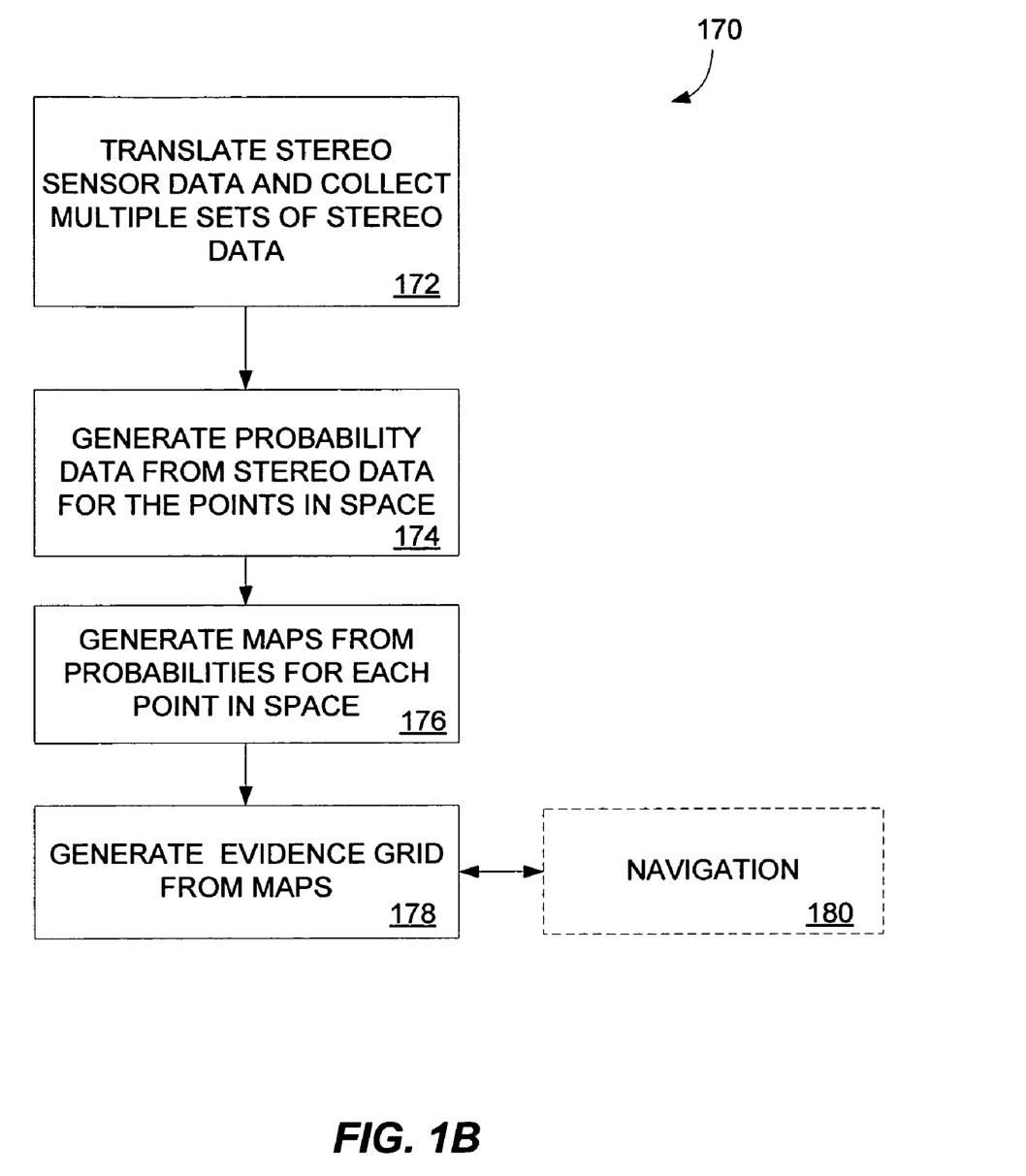

FIG. 1A is a top level flowchart 100 of a method of building an evidence grid and FIG. 1B provides a more detailed method of building an evidence grid, which may serve as an embodiment of the method of FIG. 1A. Referring to FIG. 1A and flowchart 100, in step 110 stereo sensors collect stereo ranging data by translating the system (or sensors) through the environment. In this embodiment, we presume the stereo sensors are stereo ranging cameras and the stereo data is stereo image data.

In step 120 one or more sensor models are applied to the stereo image data. This step may be optional, but it does improve the ultimate quality of the resulting evidence grid. A sensor model is a model that represents noise, errors, or both introduced by the stereo sensors, collectively referred to as "noise." Thus, the sensor model is dependent on the type of sensors used, and may reflect not only the type of sensor or sensors used, but the specific sensor or sensors used. For example, assessments of the noise introduced by each sensor may be determined by analyzing images taken by the sensor and comparing them or data related to them to known or baseline values. Differences may be construed as an indication or measure of noise introduced by the sensors. Application of the sensor models can be used to remove noise from the image data, or otherwise compensate for it. This can be done in a variety of manners. For example, in one embodiment, the sensor model can be applied as the stereo data is collected, as real-time adjustments to the sensed data. In other embodiments, after initial storage of the sensor data, sensor models may be applied to the stereo data to generate an improved set of stereo data. In yet other embodiments, the sensor models could be applied during subsequent post-processing steps.

In step 130, the stereo data from each sensor in a stereo sensor (e.g., one image from each camera in a stereo camera) is processed to determine the presence of objects, parts of objects or features (referred to as "occupancy") within the field of view of the sensor. The processing comprises analyzing the pixels of the stereo images and determining a probability of occupancy of points in space within the FOV of the stereo cameras. A relationship exists between the two images produced by a stereo sensor (e.g., two stereo cameras) that allows data from both images to be used to determine, when processed, a probability of the presence of an object, part of an object or feature at specific points in space (or locations) within the environment. The result of the processing of stereo data is, therefore, a probability of occupancy of points in space (or locations) within the environment.

Once the stereo data has been processed, the images may (optionally) be discarded, in step 140. This may be a function of the memory storage capabilities of the system, since image data files tend to be relatively large and the preferred system acquires a large amount of images. In step 150, the evidence grid is built from the probability data. The evidence grid comprises voxels that have associated voxel volumes. The value represented in the voxel volumes reflects the probability of the occupancy of a point in space within the environment—thus it is location specific. An initial set of translations through the environment could be performed to "train" the system, i.e., build an initial evidence grid that would support navigation through the environment. Navigation is shown in step 160 and may be performed using "glimpses" taken by the stereo sensors used during navigation, as discussed in more detail below.

FIG. 1B shows a flowchart 170 of a more detailed method of building an evidence grid, that may be an embodiment of the method 100 of FIG. 1A. In this embodiment the stereo sensors are stereo cameras and stereo ranging is done by achieving a combined field of view (FOV) of substantially 360 degrees. As an example, the cameras may be cameras with "global shutters," which are known in the art and commercially available from, for example, Micron Technology, Inc. A global shutter camera images all pixels at once, so avoids smearing when the image is captured. Cameras that image pixels individually or in small groups are vulnerable to smearing with motion, since their shutters would move across the area being imaged if the cameras were moved during the imaging process. Therefore, preferably, global shutter cameras are used. If such cameras were not used and smearing did occur, then the errors caused by such smearing would preferably be assessed and compensated for.

In step 172 of the flowchart of FIG. 1B, the stereo cameras are translated through the environment to collect stereo data relating to points in space within the environment. In step 174, probability data is generated from pixels in the stereo data, which take the form of images. In step 176, maps are generated from the probabilities associated with each point in space. That is, since multiple images are taken of each point in space, there may be more than one probability of occupancy associated with each point in space. The maps in step 176 may be generated from these multiple probabilities. In step 178, the evidence grid is built from the maps. In step 180, like step 160 in FIG. 1A, the evidence grid may be used for navigation through the environment.

Stereo Ranging

Figure 2A:
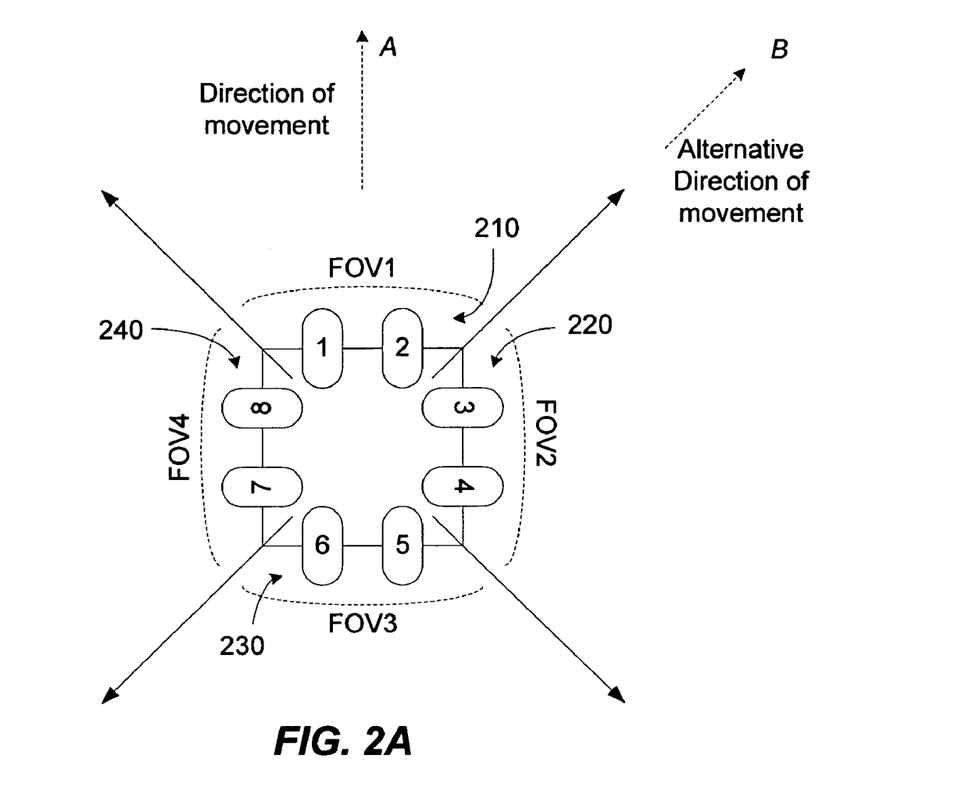
FIG. 2A is a diagram depicting an illustrative embodiment of a stereo sensor configuration useful in the method of FIG. 1

As is shown in FIG. 2A, in the illustrative embodiment a set of 4 stereo sensors is used, each having a 90° FOV—to achieve a combined FOV of substantially 360°. To achieve a 360° FOV, as examples, sets of stereo sensors could be chosen that each have the same FOV, e.g., a set of 8 stereo sensors that each have a 45° FOV, a set of 4 stereo sensors that each have a 90° FOV, a set of 3 stereo sensors that each have a 120° FOV, and so on. In other embodiments sets of stereo sensors having different FOVs could be used, e.g., a set of 4 stereo sensors that each have a 45° FOV and a set of 2 stereo sensors that each have a 90° FOV. If oriented at 45 degrees with respect to the primary direction of translation, all cameras get useful data (short and long range). Other combinations could alternatively be used. In some embodiments the FOVs of the different sets of stereo sensors could overlap. And in some embodiments the combined FOV could be less than 360°. It should also be noted that the orientation of the stereo sensors could be coplanar, but need not be. If the stereo sensors are not coplanar, relating the data from the different sensors in different planes for each point in space is a matter of known mathematics and trigonometric approaches, so not discussed in detail herein. Moving (or translating) a system equipped with stereo sensors providing a substantially 360° FOV through the environment allows each object in the environment to be imaged from several different perspectives, which ultimately provides a richer representation of objects within the 3-D evidence grid.

In FIG. 2A a first stereo sensor 210 includes sensor 1 and sensor 2, and the FOV for stereo sensor 210, i.e., FOV1, is about 90°. A second stereo sensor 220 includes sensor 3 and sensor 4, and the FOV for stereo sensor 220, i.e., FOV2, is about 90°. A third stereo sensor 230 includes sensor 5 and sensor 6, and the FOV for stereo sensor 230, i.e., FOV3, is about 90°. A fourth stereo sensor 240 includes sensor 7 and sensor 8, and the FOV for stereo sensor 240, i.e., FOV4, is about 90°. In a first embodiment the set of sensors 210, 220, 230, 240 is mounted to or integral with a system used for evidence grid building, navigation, or both, and the first set of sensors is oriented to collect data in the direction of movement, indicated by arrow A. In a different embodiment the first set of sensors is oriented to collected data at an angle of about 45° from the direction of movement, indicated by arrow B, although other angles could be used in other embodiments. Also in other embodiments, the set of sensors need not be fixed relative to the direction of motion, but in such embodiments if there were relative rotational movement of the set of sensors with respect to the direction of movement, that relative rotational movement is preferably known or capable of being determined, e.g., by measurement.

In this embodiment the stereo sensors are stereo cameras. Here each stereo camera includes 2 cameras, which "snap" images simultaneously, i.e., they are synchronized. Each snapshot is a 2-D image, but the two synchronized images taken together yield a stereo image that is cubic—having x, y, and z components. That is, with two images a depth, or z-axis data, can be determined. The images taken from the 2 cameras may be referred to as "stereo images". In the preferred form, a standard frame grabber approach is used to collect and store image data from each camera. The cameras could be black and white or color. As will be appreciated by those skilled in the art, stereo ranging does not need to be accomplished using cameras. Other types of data collection means could be used, e.g., ultrasonic sensors. Also, in other embodiments, rather than a set of stereo cameras, a single camera could be used without synchronization, but the movement of the system would need to be determinable so that the relative location of the camera at each image could be determined—this approach is generally not preferred.

Figure 2B:
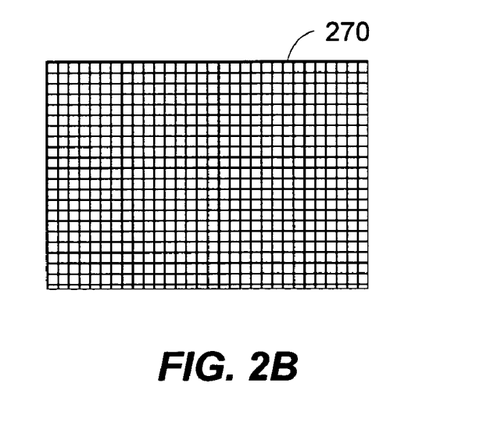
FIG. 2B is a view of an image matrix and FIG. 2C is a diagram of a stereo sensor from FIG. 2A.

Also in the preferred form, as between two cameras that comprise a stereo camera, a single camera is chosen as a "baseline" camera, e.g., camera 1 of the first stereo camera 210 of FIG. 2A could be chosen. As such, the image from camera 1 is designated as a baseline image (or first image) and has a defined coordinate system. The image from camera 2 is expected to be slightly different from the baseline image and may be referred to as the second image. As used herein, "image" means the representation of the projection of light onto a camera lens, and is comprised of data corresponding to a matrix (i.e., rows and columns) of pixels, as is shown in the representative image matrix 270 of FIG. 2B. The difference between the first image and second image is largely due to the fact that the second camera is physically displaced from the first camera, as shown in FIG. 2C, and may also be due, at least in part, to differences in the cameras themselves.

Figure 2C:
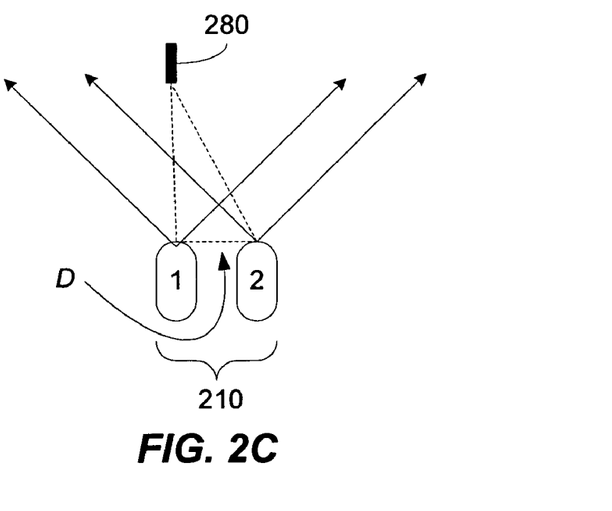

In the preferred form, the physical displacement between the cameras, or between the lenses of the cameras, is a known distance, referred to here as D, as shown in FIG. 2C. As can be seen, the physical displacement between the lenses of cameras 1 and 2 results in an angular difference in the perspective of each camera when imaging the same object 280. If the cameras are placed at the same height, which in the preferred embodiment they are, then there is only a need to analyze the viewing perspective differences in the horizontal, and not in the vertical.

Figure 3A:
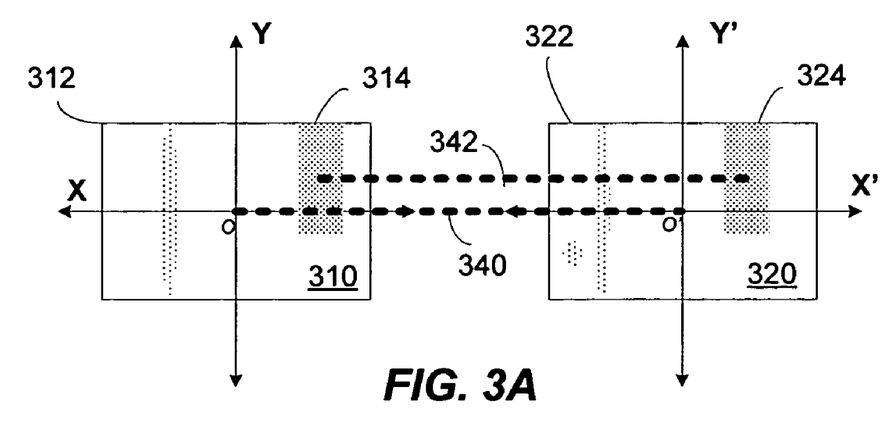
FIG. 3A is a diagram of a set of images generated by the stereo sensors of FIG. 2A and FIG. 2B

FIG. 3A shows a set of two stereo images, i.e., a baseline or first image 310 taken from camera 1 and a second image 320 taken from camera 2. FIG. 3A is an example where the origin (i.e., the intersection of the Y-axis and X-axis) of the coordinate system defined for each image is at the center of the image. Due to the side-by-side orientation of the cameras, image 310 and image 320 are not expected to be identical, as discussed above. They will have different origins (O and O') and Y-axes (i.e., Y and Y'). However, since there is substantially no vertical difference between the two cameras the X-axes of the two coordinate systems (i.e., X and X') will be substantially collinear.

In the stereo ranging of the preferred embodiment, the system looks for "pixel disparity" between the two images from the stereo cameras—i.e., the baseline image and the second image. Therefore, a relationship between the pixels of the baseline image and the pixels of the second image must be defined or determined. This is accomplished by knowing the line of separation between the 2 cameras, e.g., the physical distance D between camera 1 and camera 2 in FIG. 2. Using that physical separation and distance calculations performed using the image data, the line 340 that connects the origin O of the baseline image and the origin O' of the second image can determined. For the most part, the same relationship is presumed to exist between all corresponding pixels of the baseline image and the second image. Thus, knowing the line 340 that connects the origins O and O' allows the relationship between corresponding pixels of the stereo images to be determined, as line 342. Therefore, a pixel at the center of the pixel group 314 in image 312 from camera 1 can be mapped to a corresponding pixel in the group of pixels 324 in image 322 from camera 2. Line 342 represents the relationship between these pixels, and is substantially the same as line 340.

When determining the presence of an object at a point in space represented by a pixel, the system processes the data from each image produced by the stereo cameras, which provide different sets of image data for the same points in space. In the preferred form, the system looks for pixel disparity along the line that connect two pixels (e.g., line 342 of FIG. 3A)—1 pixel from each image. Because there is no vertical displacement difference between the two cameras, pixel disparity up and down is not checked. If there were vertical displacement, then pixel disparity could be checked vertically as well. If the stereo cameras were offset in both the vertical and horizontal directions (i.e., X and Y directions), then pixel disparity could be checked in both. If there was relative displacement in the third dimension (i.e., the Z direction) then pixel disparity could be checked there as well.

The systems and methods described herein do not rely on "feature extraction" in processing the images, as is done in many other systems, nor do they rely on image enhancement. Although either could be used within the context of the described system. Rather, the systems and method look at each pixel to determine whether or not an object is present. Pixels are represented by, for example, either an 8 or 16 bit number or word. This allows the system to process on a grey scale, rather than merely black and white. In other embodiments pixels could be represented by larger or small bit words. Generally, a probabilistic mathematical metric is applied to a "blob" (or cluster) of pixels in each image. The system looks at each blob to determine if a minimum figure of merit (FOM) exists, which is a function of a pixel to pixel contrast ratio within the blob. The system looks first at the baseline image and then for a corresponding blob in the second image along the line that relates the images (e.g., lines 340 and 342 of FIG. 3A).

Figure 3B:
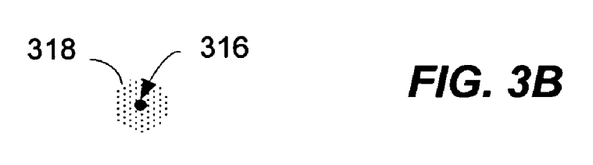
FIG. 3B is a view of a pixel and FIG. 3C is a set of relationships between pixels of the baseline image and the second image of FIG. 3B.

In FIG. 3B, a pixel 316 from object 314 of FIG. 3A is taken as a center pixel, within a blob of pixels 318. Here, as an example, the blob is chosen as a circle of pixels having a radius of about 7 pixels. The system looks at the blob to determine if there is a contrast among the pixels within the blob 318. In the preferred form, the determination of whether or not a contrast exists is accomplished by taking a sum of squares of the intensity (i.e., the 8 or 16 bit word) for each pixel in the blob. Other mathematical approaches known in the art may alternatively be used to process the blobs to find contrast, i.e., such as any of a variety of known statistical analysis approaches. If the minimum FOM is found, then the pixel 316 there is a probability of an object in the environment at the location represented by the blob of pixels processed.

Figure 3C:
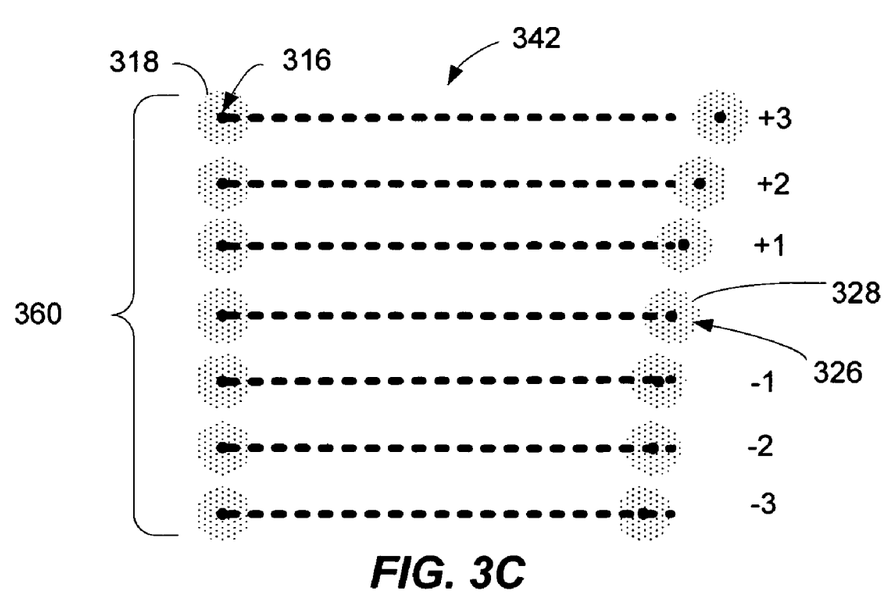

As is shown in FIG. 3C, for the pixel 316 analyzed in the first image 312 of FIG. 3A, the system looks along the line 342 that separates the two cameras to find the corresponding pixel 326 in the second image 322. The system looks ±3 pixels to determine the corresponding center pixel 326, in this embodiment, which accounts for potential errors that would cause the second image to be slightly askew with respect to the first image. FIG. 3C depicts a set 360 of first image blobs related to second image blobs along line 342, including the ±3 pixel blobs. The blob 328, from the set 360 of ±3 pixel blobs in the second image, that has the best FOM match to blob 318 is chosen as corresponding to blob 318. For example, it could be the blob 328 centered at the "−1" pixel location. That is, the system looks for blobs with same value, e.g., sum of squares value, in the second image and pick best one. Once that is done, then the image data for a given pixel within those corresponding blobs can be further processed to determine whether or not an object exists at a corresponding voxel within the evidence grid. The system is not doing feature extraction or object identification, just looking for characteristics of images and where they are similar.

As a separate issue, and as briefly mentioned above, different operators could be used for assessing the contrast within a blob of pixels, e.g., Gaussian, exponential, parabolic, sine distribution. Optionally, the system could "clip" (i.e., ignore values above or below threshold values) such distributions to get rid of noise—as a processing efficiency and accuracy improvement.

Processing of the blobs generates a map of the environment, which says things of interest have some FOM and also determines the distance of the thing of interest (i.e., object) from the camera. The distance is proportional to pixel disparity right to left, which can be calculated from the triangle shown in FIG. 2B. Calculations are from the point where the image was snapped. Pixel disparity is disparity from one image to the other image, i.e., from the baseline image to the second image. Thus, the system determines: 3-D location of points representing objects, FOM for each point, and the dist from the camera to each point. In this embodiment, the sum of squares of the differences of the contrast of a group of pixels in a "spherous thing" a relatively unique identifier when only looking along a line.

Apply Sensor Model

Figure 4A:
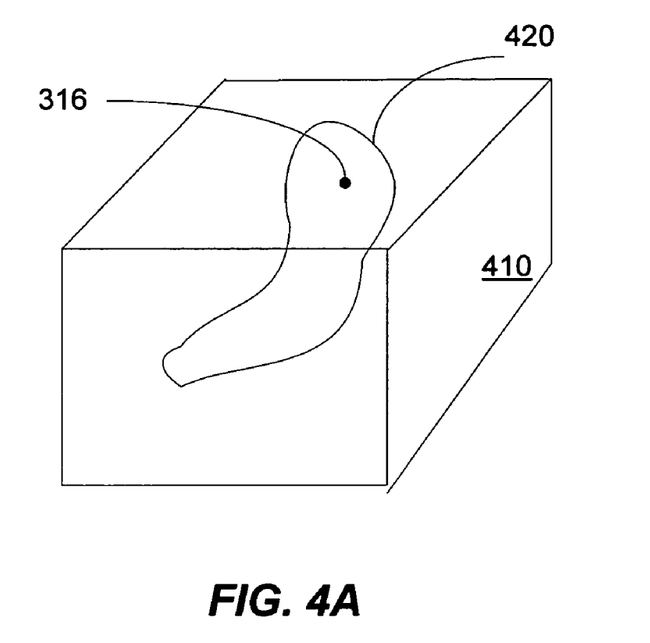
FIG. 4A is diagram of a sensor model curve for a point and FIG. 4B is a probability curve for the sensor model of FIG. 4A.
Figure 4B:
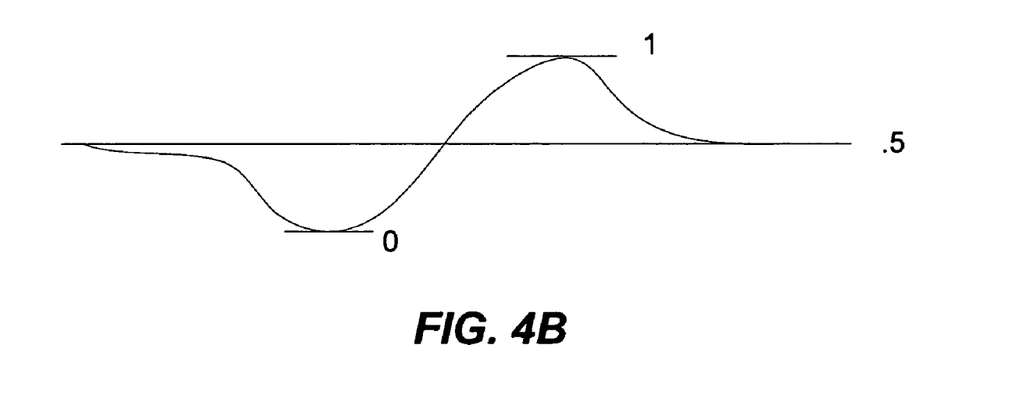

The sensor model represents inaccuracies of the sensors. The model, therefore, allows the system to eliminate or significantly reduce noise, or other inherent system/sensor introduced errors. As mentioned above with respect to FIG. 1A, the sensor models could be applied at any of a variety of points in the process of collecting or processing the stereo data. As is shown in FIG. 4A, the system looks into cubic space 410, because points have x, y, and z values, then applies sensor model 420 (3-D shape that shows probability of their being an object in space) to each point 316 found above from the image data. The sensor model shape relates to the uncertainty or probability associated with the points. The shape also reflects that the understanding behind an object is typically very low, but the understanding in front of the object is typically very good. FIG. 4B shows one possible representation of the probability curve (viewed from the side), where, for a given point represented by a voxel within the evidence grid, 0=empty, 1=occupied, 0.5 unknown.

In the preferred embodiment, a sensor model may be built (i.e., values for the curves in 4A and 4B) offline, as a one-time event. This can be done by running the system with a set of images, and letting it adjust the parameters, like depth, length, width etc., as more and more images are taken and processed. One approach is to keep running "learning models" for days at a time, as system adjusts parameters, we find when are we getting closer and closer matches. Learning models, as used herein, may be translations through the environment that include the collection and processing of image data to determine the error introduced by the sensors. Sensor models could also be "canned", i.e., available in advance as a set of data for a given set of stereo sensors. If not canned, building the sensor model is generally a 1-time thing—once built it does not need to be built again for the system. In other approaches, the sensor model could initially be canned and then subsequently adjusted using learning models, e.g., within the environment. The more general the sensor model is, the better the system typically works, because some characteristics of facilities may be common, but specific sets of characteristics for a given system, if too greatly relied on, could cause errors in the system if those characteristics are later altered. Once built, the sensor model can be applied as a look-up table—to make computations faster.

Build Evidence Grid

Figure 5A:
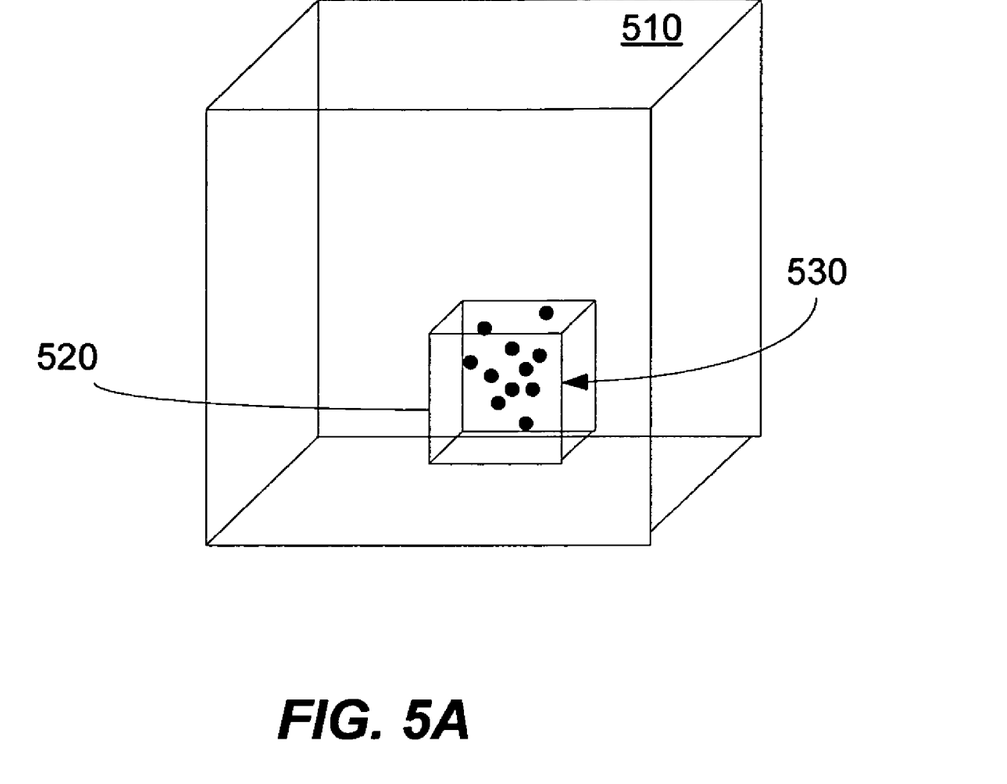
FIG. 5A is a diagram of a cloud of probability data and FIG. 5B is an extended local map (ELM) generated by combining cubic volumes comprising point clouds.

In this embodiment, building the evidence grid is generated from maps generated by summing a set of point clouds (i.e., clouds of voxels), as is shown in FIG. 5A. Points clouds represent the probability of occupancy at points in space as determined from the stereo image data. In FIG. 5A, within a cubic volume 510 there are several smaller cubic collections of point clouds, e.g., cubic volume 520 that includes a point cloud 530. Each point in the point cloud is comprised of voxels that include the probability that there is an object at the corresponding point in the environment. The point cloud, therefore, is a set of voxels related to points in space within a set of stereo image data. Many point clouds, taken at various locations within the environment, can include probability information for the same point in space, or voxel.

The system tracks the translation of the system through the environment, so it knows the relationships among the multiple images, thus allowing corresponding voxels in each of the multiple images to be combined. In the preferred embodiment, the system keeps track of translation through the environment using odometry, but could use any other known tracking mechanism, or could track translation using the image data, or could use a combination of approaches (and perhaps use an average or weighted average among those different approaches). So, for example, if one image shows a voxel as being occupied and three other images show that voxel as not being occupied, then the one voxel was likely noise and that noise will fall out of the system. If, for example, all four images show the voxel as being occupied, then there is a very high probability of occupancy of the voxel. Therefore, the resulting evidence grid represents the probability of occupancy (i.e., the presence of an object) at the voxel as high (or occupied).

Figure 5B:
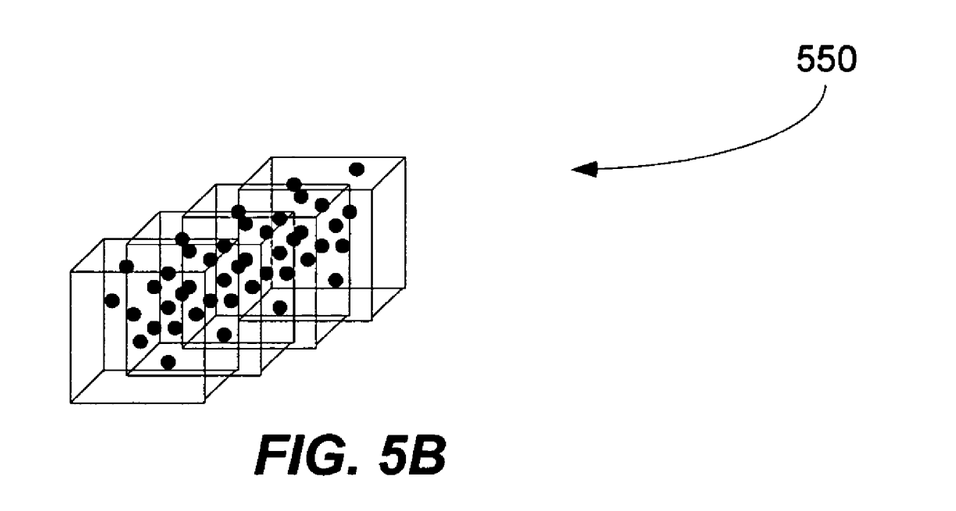

The combination of the probabilities of point clouds related to each voxel may be used to create maps that represent the probabilities associated with the various points in space, and may take the form of an extended local map (ELM), see FIG. 5B. Since the stereo images were taken at different places, the resulting cubic volumes of probability data do not completely overlap, as seen with the overlapping cubic volumes 550. There is some small offset between the cubes that could be expected.

The system does not, preferably, store the raw image data; once used the images can be discarded, as discussed above with respect to FIG. 1A. The system does, however, continue to update the probabilities using new image data. Every time the system takes images, it adds image probabilities into cubic volume probability clouds. So if something was removed from the environment, it would fall out over time. This process is continued until the evidence grid is built. Every time new images are taken, the evidence grid is updated. Updates can also be performed after the evidence grid is built, during operational navigation through the environment.

Determining Location From Images

In addition to, or in combination with, the odometry approach for determining the location of the system in the environment during translation, discussed above, the system could determine the location of the system from the images. To do this, the system looks at a plane of pixels that is parallel to travel direction, i.e., looking at the sides of system. The system knows the speed of the system and the physical relationship (e.g., distance separation) between the cameras. Given the foregoing information, the system can find common features between stereo images and figure displacement, and thus that would give system positioning. This approach requires less reliance on external sources.

Voxels

As example, the voxels include information that weight the evidence of different kinds of characteristics, such as occupancy, heat, surface orientation. The type of weighted evidence depends on the types of sensors used to accumulate data (e.g., camera, radar, etc.). Evidence grid calculations are preferably based on the application of Bayes' Theorem to derive a probability model for each particular sensor. Bayes' Theorem incorporates prior information into the probability that a given situation exists, and is well known in the art. The probability data is accumulated for each voxel, as described above. The evidence grid may be updated by subsequent translations through the facility. Updates allow for dynamic changes in the evidence grid, e.g., to accommodate the introduction or removal of items within the facility. The facility map may then be used by a robot, or other automated device or vehicle, to navigate the facility. It should be noted that it is not necessarily essential that the facility map is highly accurate from a "real world" perspective to allow accurate navigation. It is more important that the facility map is accurate from the perspective of the robot.

Computer Diagram

Figure 6:
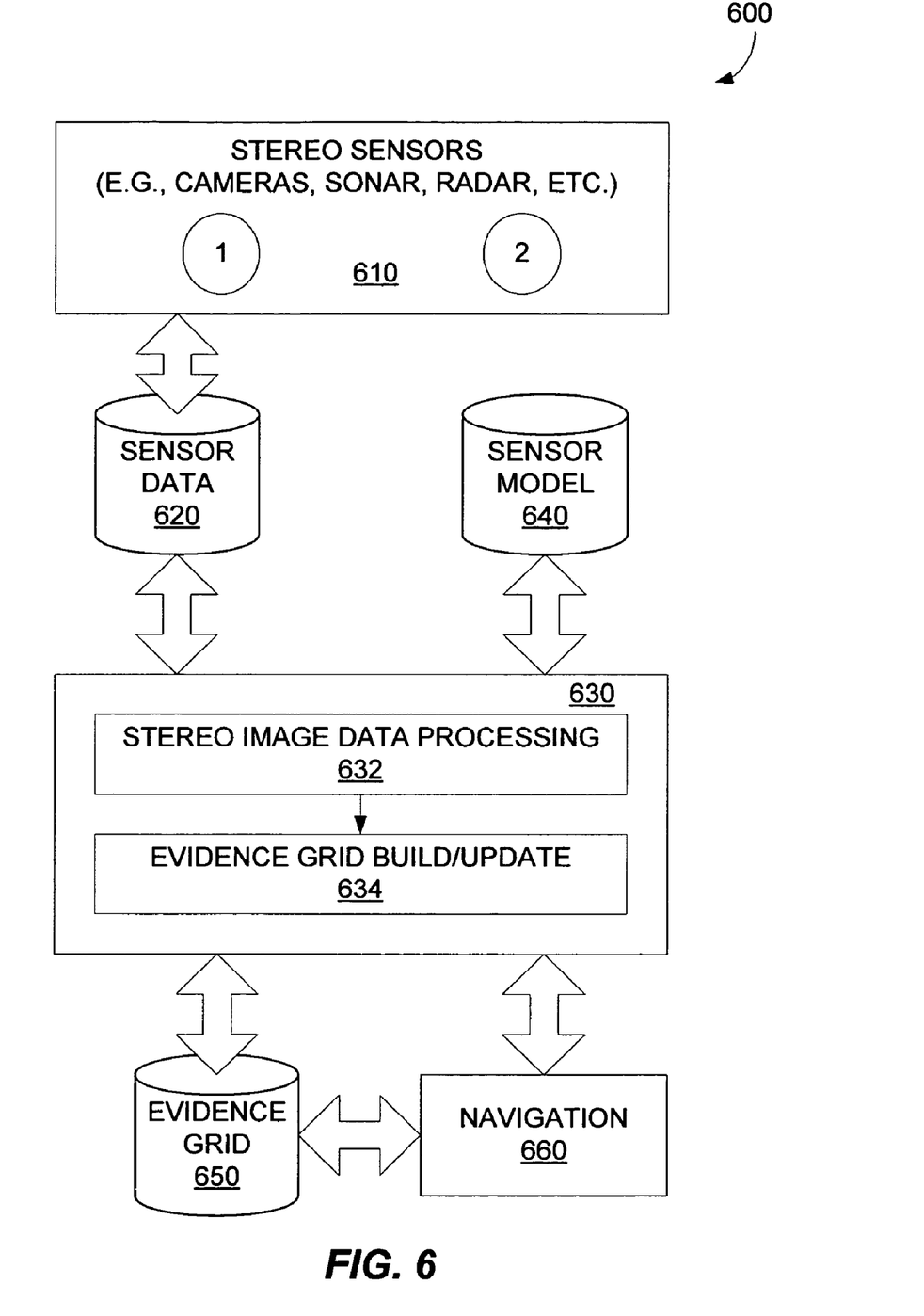
FIG. 6 is a representative block diagram of various function or program modules that may comprise a system and database that implement the method of FIG. 1.

FIG. 6 is a block diagram 600 depicting one, illustrative embodiment of a evidence grid generation system in accordance with the present invention, which can implement the flowchart of FIG. 1. The modules depicted in FIG. 6 may be implemented in software, hardware, firmware or some combination therefore. A set of stereo sensors 610 is used to collect data, which may be stored in a sensor database 620. The sensors can be cameras, sonar, radar or any other type of sensor known in the art. Preferably stereo sensor are used, rather than individual sensors, and the stereo sensors include two or more sensors, but as previously discussed more or less sensors could be used. One sensor is generally not optimal, but may suffice in some circumstances. Also, preferably, the system uses a 360 degree FOV or close to it, which provides the most image data for the environment during a typical translation.

A evidence grid building module 630 includes a stereo image data processing module 632 that applies the sensor data from sensor database 640 to the image data from sensor database 620 for generating the associating occupancy probabilities with voxels in the evidence grid. The evidence grid build/update module 634 sums the probabilities for each voxel from multiple images to build or update the evidence grid, which may be stored in evidence grid database 650. A navigation module 660 may be included that is configured to use the evidence grid to translate through the environment.

Figure 7A:
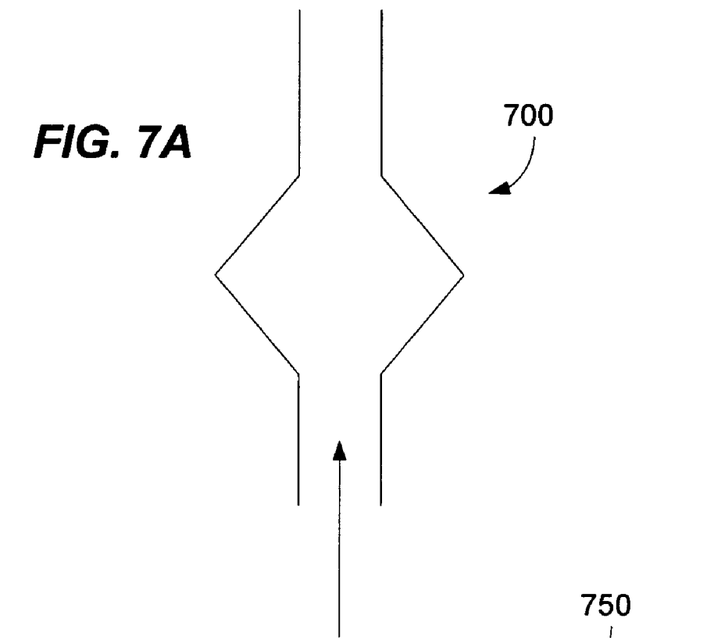
FIG. 7A is a diagram of an environment and FIG. 7B is an evidence grid representing the hallway of FIG. 7A.
Figure 7B:
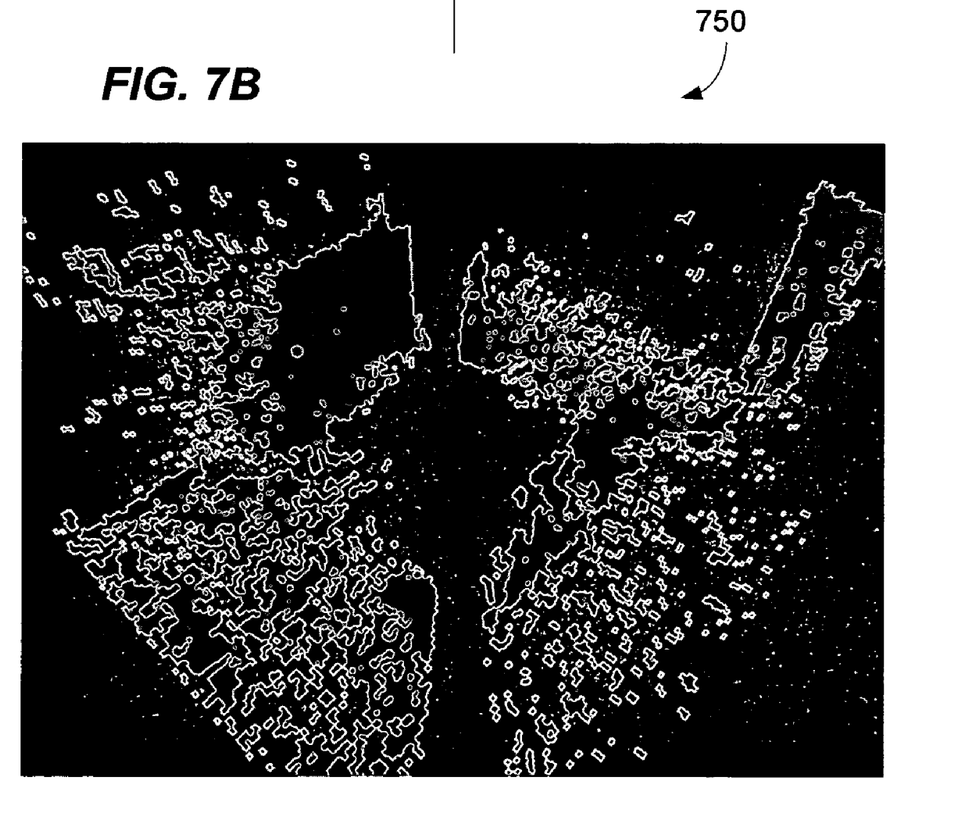

FIG. 7A is a square hallway 700 and FIG. 7B is a 3-D evidence grid 750 of the square hallway created with the method and system for FIGS. 1 and 6, respectively, as examples. As will be appreciated by those skilled in the art, the present invention may be used to generate evidence grids for facilities and pathways and other places of interest. It is not essential that the system and method be restricted to indoor facilities—it could also be used outdoors. The system may also include thresholds for evidence grid generation, such that it generates an indication of when the data collection is sufficient to provide an evidence grid having a certain predetermined minimum confidence level.

Navigation and Localization

Navigation using the evidence grid can be accomplished by a process of determining from image data where within the evidence grid the system is, referred to herein as "localization". That is, for navigation the system is configured for computing its current position from current image data, by comparing the current image data to the stored map data (evidence grid). The evidence grid may be built as provided above, or could be built by some other means.

As the system translates, the stereo sensors take snapshots to perform stereo ranging. The sensor model is applied to the stereo range data, as discussed above, to create a "glimpse". A glimpse is a small evidence grid—a cloud of probabilities of objects being there, (see FIG. 5A). Then look in evidence grid data and do another sum of squares and matching of blobs (i.e., probabilities).

The system uses an approach for "throwing rays" to determine where points of interest are in current glimpse. This is a guess based on last known position and where the system believes it is within evidence grid. Therefore, there is an expectation of where the system believes it is and, according to that, the system "throws rays" out with an expectation of getting certain "hits" or a match in certain locations. To get a match, empty (or unoccupied) spaces should match empty spaces, and occupied spaces should match occupied spaces. If the pattern of hits is consistent with the pattern of voxels in the evidence grid, then the system believes that it knows where it is located—within the frame of reference of the evidence grid. This is done for some number of points, where the rays are thrown outward from each point. For example, minimum threshold number of points could be used, e.g., at least 350-400 hits. For example, within some expectation of error, the system could test fit 400 points from current image, with 400 points of existing evidence grid—by throwing rays onto existing evidence grid from each of the 400 points.

Presently, the system throws rays based on last known position, so it knows roughly where it is. Therefore, the system only searches in a certain range within evidence grid. If the system is lost, the system can do a wider scale look (coarser grid), before it gives up. The system could be configured with face recognition software to improve accuracy. Once the evidence grid is made, what happens if things moved? There is still enough data that will match (e.g., columns, walls, shelf posts, etc.), so the system should still be able to locate itself. The system will also update the evidence grid to account for the things moved.

In any of the various embodiment, the system configured to navigate using the evidence grid may comprise a mobile body including an engagement mechanism movably coupled to the mobile body and configured to support an object, such as forklift, stacker, order picker or the like.

Related Information

In various embodiments, we propose the use of 3-D evidence grids as a mechanism to provide a reliable and precise Cartesian framework through which objects can be located, identified, grasped, manipulated, and assembled. 3-D evidence grids are particularly suited to this job because they provide a fast and efficient way to provide a self-updating, real-time 3-D Cartesian coordinate occupancy mapping of a changing environment. 3-D evidence grids also provide a statistical framework to accumulate and weigh other types of object identification evidence, and, by nature, provide a smooth degradation function, preventing catastrophic failure.

Because evidence grids subdivide accumulated data from repeated sensor measurements into a spatially organized regular array, they allow very noisy sensor data to be statistically combined into reliable representations of a robot's environment. By accumulating a more specialized kind of high-resolution sensor-derived evidence, we can construct an evidence grid with enough accuracy and precision to provide highly reliable recognition and autonomous manipulation of objects in the grid-space.

An added benefit of the use of evidence grids is that the preprocessing of the sensory measurements provides a 3-D starting point with absolute, viewpoint-invariant scale and shape. This greatly simplifies the task of recognizing objects in the work area. Rigid objects—that is, fixed objects made of inflexible materials, such as tools or metal assembly parts—can be pre-classified quickly by calculating and matching a simple moment vector, then precisely identified and located with a statistical template fit. Objects made of flexible, stretchy, or yielding material, such as rubber sheeting or fabric, or objects with variable size and shape (e.g., chairs, tables), can be identified using a feature-based trainable statistical classifier, similar to those used for optical character recognition.

Surface color can be incorporated into the grid and used to aid identification by "projecting" colors perceived by the cameras onto the occupied cells in previously-constructed grid representations of the 3-D scene. Other measurements derived from contact or non-contact sensors these may include temperature, color, surface orientation, texture, or surface hardness.

Evidence grids are an excellent way to fuse data from multiple sensors. Stereo cameras are just one way to define an environment, for example, lasers and heat sensors could be used alone or in concert with the stereo cameras to introduce evidence of temperature and surface orientation to the model. Any number of hardware configurations can be used to provide different kinds of evidence about an environment.

With various methods that may be implemented in accordance with the present invention, it no longer matters that a significant percentage of the stereo data are incorrectly matched, because the statistical analysis causes aberrant data (i.e., mismatched pixels) to drop out of the results. The grid approach allows ambiguities in individual measurements to be represented as a tuned probability profile that adds evidence, whether weak or strong, to an accumulating map. Multiple views gradually fill in gaps and reduce ambiguities until the desired model quality is achieved.

3-D Grid representation is better than hardware sensing for complex scenes with many overlapping surfaces, because it handles errors and ambiguities gracefully. But grid representation can also improve data from the best sensing hardware. No matter how good or bad the data are, they can be improved by using them as input to grid maps.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of generating a multidimensional evidence grid representing an environment, the method comprising:
    A1. using learned sensor models to determine the settings and parameters to be used in stereo processing and evidence grid generation;
    A2. collecting stereo data at multiple locations within the environment using stereo sensors during a training run using machine odometry to determine imaging locations;
    B. from the stereo data, generating probability clouds comprising voxels, each voxel representing an occupancy of a corresponding point in space;
    C. from the probability clouds, generating maps comprising combined probabilities of voxels associated with the points in space; and
    D. combining the maps to form a multidimensional evidence grid representing the environment with a plurality of voxels, each voxel embodying a resulting probability of occupancy corresponding point in space.

2. The method of claim 1, further comprising:
    E. navigating a mobile apparatus through the environment using the evidence grid.

3. The method of claim 2 wherein the navigating of step E comprises:
    1) acquiring glimpse stereo data using the stereo sensors;
    2) determining glimpse probabilities of occupancy from the glimpse stereo data and associating the glimpse probabilities with voxels in the evidence grid;
    3) determining the location of the mobile apparatus by comparing the glimpse probabilities with the probabilities associated with corresponding voxels in the evidence grid; and
    4) using a sensor model specifically tuned to enhance the performance of navigation.

4. The method of claim 3, further comprising:
    F. updating the evidence grid as a function of the glimpses.

5. The method of claim 4, wherein step F comprises:
    1) combining the glimpse stereo data with the stereo data and repeating steps B through E.

6. The method of claim 1 wherein the stereo sensors comprises stereo cameras.

7. The method of claim 1, wherein the stereo sensors comprises sensors oriented on different, parallel planes.

8. The method of claim 1 wherein a high probability of occupancy of a voxel indicates the presence of a tangible object at the point in space represented by the voxel.

9. The method of claim 1 wherein the multidimensional evidence grid is a three dimensional evidence grid.

10. The method of claim 1 wherein the collecting of stereo data includes removing noise and errors attributed to the stereo sensors and represented in sensor models.

11. The method of claim 1 wherein occupancy relates to the absence or presence of an object, a part of an object or a feature.

12. A mobile apparatus configured for automated navigation within an environment, the mobile apparatus comprising:
    A. a mobile body configured for motorized translation within an environment;
    B. a translator configured to translate the mobile body in response to a set of navigation instructions;
    C. a set of stereo sensors configured for acquiring stereo data within the environment, including collecting stereo data at multiple locations within the environment using stereo sensors during a training run to determine imaging locations;
    D. a storage device including learned sensor models and a multidimensional evidence grid comprising a plurality of voxels representing the environment and having associated with each voxel a probability of occupancy; and
    E. a processor configured for executing a set of navigation logic configured for:
        1) taking glimpses of the environment using the stereo sensors, wherein a glimpse comprises glimpse stereo data taken during navigation;
        2) associating probability and location data from the glimpse stereo data with voxels in the evidence grid;
        3) determining the location of the mobile apparatus by comparing the glimpse stereo data associated with the voxels with the probabilities associated with corresponding voxels in the evidence grid; and
        4) using a sensor model specifically tuned to enhance the performance of navigation.

13. The mobile apparatus of claim 12, further comprising an engagement mechanism movably coupled to the mobile body and configured to support an object.

14. The mobile apparatus of claim 13 wherein the apparatus is a forklift.

15. The mobile apparatus of claim 13 wherein the apparatus is a stacker.

16. The mobile apparatus of claim 13 wherein the apparatus is an order picker.

17. The mobile apparatus of claim 12 wherein the engagement mechanism comprises engagement logic configured for engaging and supporting the object, the engagement logic comprising object identification logic configured for determining parametric information of the object as a function of object sensor data obtained by the set of stereo sensors.

18. The apparatus of claim 17 wherein the parametric information comprises information representing a size and a shape of the object.

19. The method of claim 12, wherein the navigation logic further comprises logic for updating the evidence grid as a function of the glimpses.

20. The mobile apparatus of claim 12 wherein the stereo sensors comprises stereo cameras.

21. The mobile apparatus of claim 12 wherein the stereo sensors comprises sensors oriented on different, parallel planes.

22. The mobile apparatus of claim 12 wherein a high probability of occupancy of a voxel indicates the presence of a tangible object at the point in space represented by the voxel.

23. The mobile apparatus of claim 12 wherein the multidimensional evidence grid is a three dimensional evidence grid.

* * * * *